United States Patent [19]

Tobias

[11] 4,289,405
[45] Sep. 15, 1981

[54] COLOR MONITORING SYSTEM FOR USE IN CREATING COLORED DISPLAYS

[76] Inventor: Philip E. Tobias, 1872 Watson Rd., Abington, Pa. 19001

[21] Appl. No.: 951,444

[22] Filed: Oct. 13, 1978

[51] Int. Cl.³ ............................................. G01N 21/27
[52] U.S. Cl. ...................................... 356/407; 250/226
[58] Field of Search ............... 356/404, 406, 407, 419, 356/425; 250/326

[56] References Cited

U.S. PATENT DOCUMENTS

| | | | |
|---|---|---|---|
| 3,210,552 | 10/1965 | Young | 356/407 X |
| 4,003,660 | 1/1977 | Christie, Jr. et al. | 250/226 |
| 4,194,839 | 3/1980 | Knop | 356/407 |
| 4,203,671 | 5/1980 | Takahashi et al. | 356/402 |

*Primary Examiner*—John K. Corbin
*Assistant Examiner*—Bruce Y. Arnold
*Attorney, Agent, or Firm*—William E. Cleaver

[57] ABSTRACT

The present invention provides a means for readily monitoring the optical densities of colors which make up a display or particular arrangement (such as pictures in a magazine which are printed with colored inks), and includes means for automatically detecting which of the basic colors predominant in a color is being monitored. In addition the present invention includes means to indicate to the user that the optical density of a predominant basic color detected is satisfactory with respect to, or different from, a desired reference value and provides information to enable the user to correct the optical densities of the basic colors being used prior to creating future displays, for instance the system provides information to enable the user to readily adjust the ink flow in a printing press during a printing "run."

10 Claims, 13 Drawing Figures

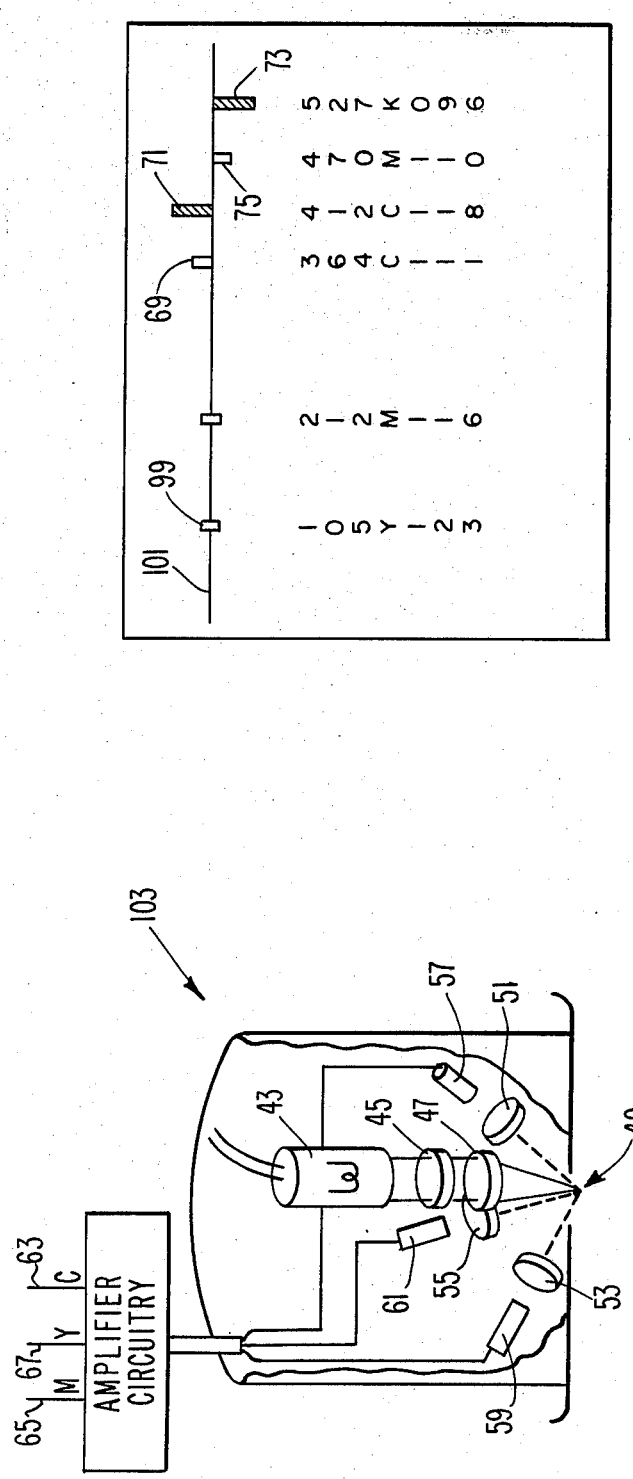
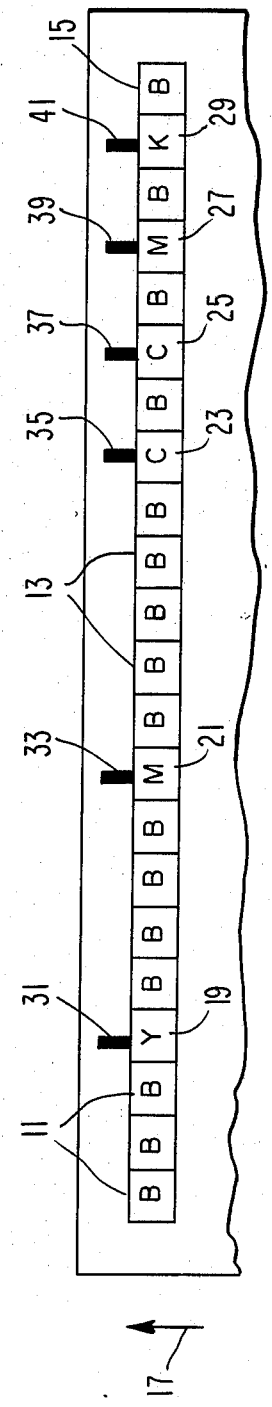
Fig. 1
Fig. 2
Fig. 3

COLOR MONITORING SYSTEM FOR USE IN CREATING COLORED DISPLAYS

BACKGROUND

The present invention will be described in connection with displays that are created with colored ink but it should be borne in mind that the system could be used with a display that is created with paints, dyes, or some other color bearing material. When a pattern is going to be printed on paper with colored inks (in the so called process color printing), the color arrangement is accomplished by separately printing partial patterns respectively with four basic colors, i.e., cyan, magenta, yellow and black. Patterns of small dots or large dots or mixtures thereof are printed, depending on the optical densities of the colors to be effected. The optical density of a color is related to the ink film thickness and is a measure of the strength of the color that is identified or seen or appreciated by the viewer. If the printing is accomplished, for example by an offset printing technique, the surface of the printing plate is chemically formed into a pattern of small dots of variable areas, which hold ink therein and the ink is transferred to the paper during the printing of the pattern. If the printing is accomplished by a letterpress plate, or raised metallic islands, then the islands are the dots and the ink rests on the islands and is transferred to the paper during the printing process. If the ink flow to the printing plate is different from time to time, then as it is transferred, (by either method), the end results will be different and the colors will not appear to be the same from one printed copy to another.

In the prior art when a printer was engaged in printing a pattern and he wanted to determine whether or not the color was remaining constant he would proceed as follows. He would take a sample of the printed copy and using a static densitometer would take readings at several places along a color swatch line, make some calculations from the information that he obtained with his static densitometer and then determine what, if anything, he should do about the discrepancies between a reference optical density that he desired and the actual optical density of the copy which was being printed. The present device provides a means for automatically scanning the color swatch line. The present device provides a means for determining, during the scan, the optical densities of the colors of inks that have been laid down on the paper so that the ink flow can be changed quickly in response to the monitoring results, thereby effecting an early correction and reducing the amount of copy which may result in waste. It should be understood that while the foregoing problems have been described for the color processing technique, the same problems exist in the prior art for maintaining and monitoring solid prints of non-process colored ink, as in label or can wrapper printing.

SUMMARY

In the present system there is included a read head which has a centrally located light source therein. The light from this centrally located source is disposed so that its output beam is directed substantially orthogonal to the copy bearing the colored display. As will be explained below and hereinafter, the light is normally bounced off a basic color pattern (the basic colors being cyan, magenta, yellow and black) which is printed on the copy. The reflected light is transmitted simultaneously to three different photo sensitive-filter means. In the preferred embodiment there is provided a photo sensitive-filter means for each of the three chromatic colors and these respective means generate electrical signals having logarithmic relationships to the light intensities and which are representative of the optical density of the particular color with which they are associated. The signals from these photo sensitive-filter means are digitized, compared in a microprocessor device against a reference value of optical density (the reference value being located in a memory means associated with the microprocessor device). The difference, or lack of difference, between the optical density value of the basic color read by the head and the reference value of the optical density stored in the memory is automatically shown on a video display device as a type of bar graph. The video display also indicates to the user the approximate physical location of the color swatch being read with respect to the printed copy on which the swatch bar is printed so that if the optical density should be corrected the user can readily determine where on an ink dispensing device (such as a printing press) the ink flow adjustment should be made. All of the foregoing information generation is accomplished automatically so that the time necessary to accomplish the monitoring of printed copy and making the corrections is relatively short.

The objects and features of the present invention will be better understood from studying the description hereinafter taken in conjunction with the drawings wherein:

FIG. 1 is a pictorial schematic of the read head;

FIG. 2 is a pictorial schematic of a basic color swatch line;

FIG. 3 is an example of a video display;

Figure 6:
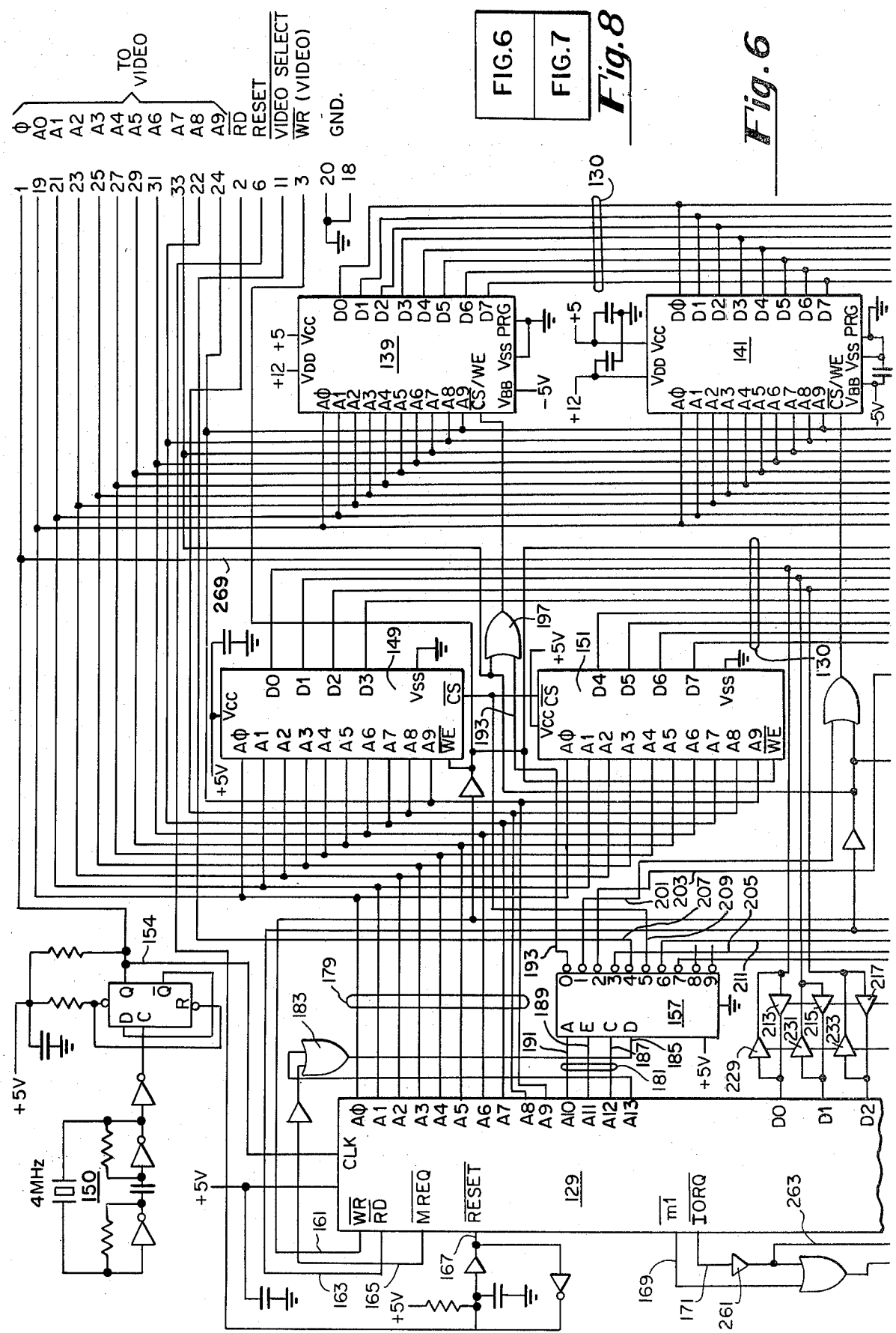
Figure 7:
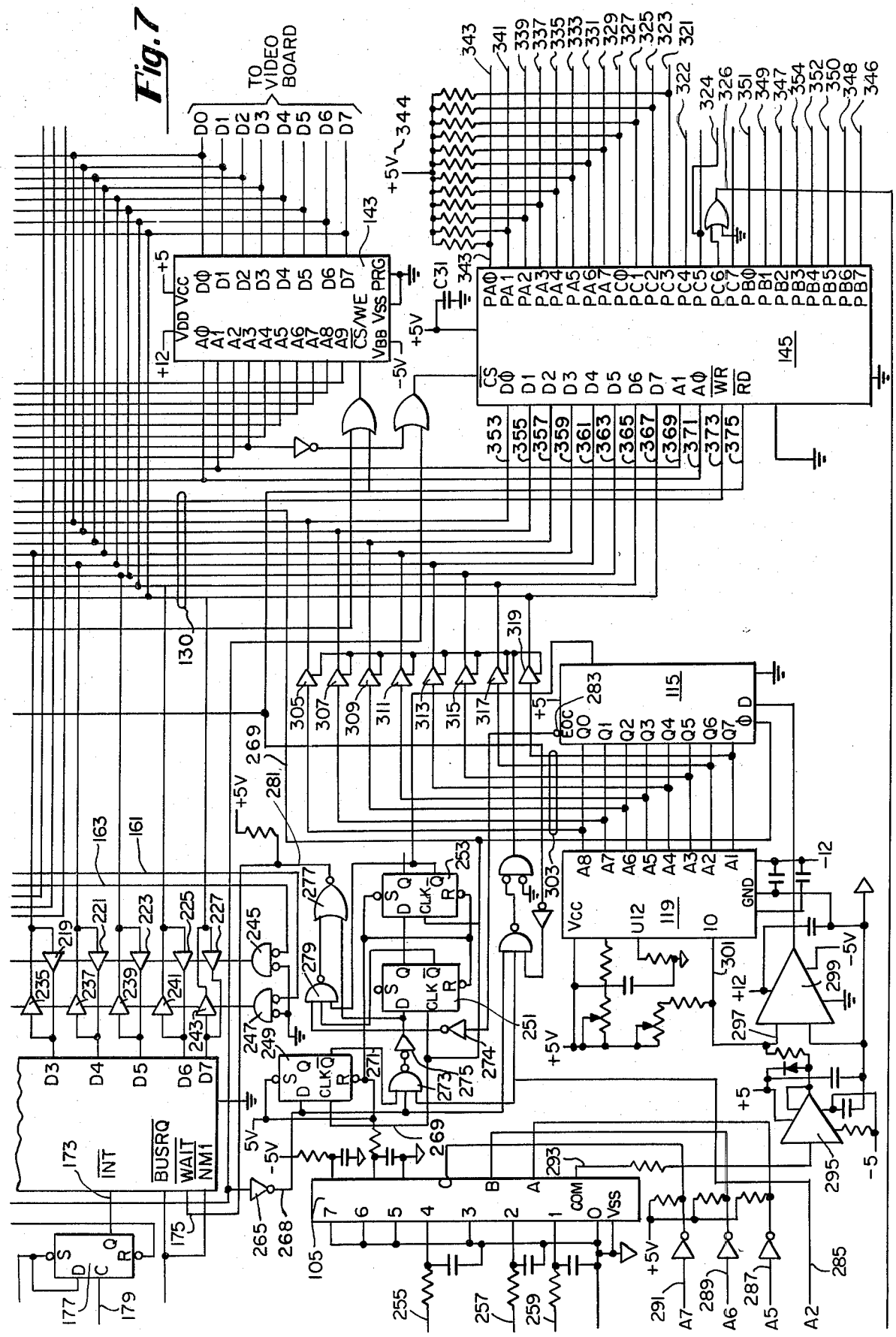
Figure 9:
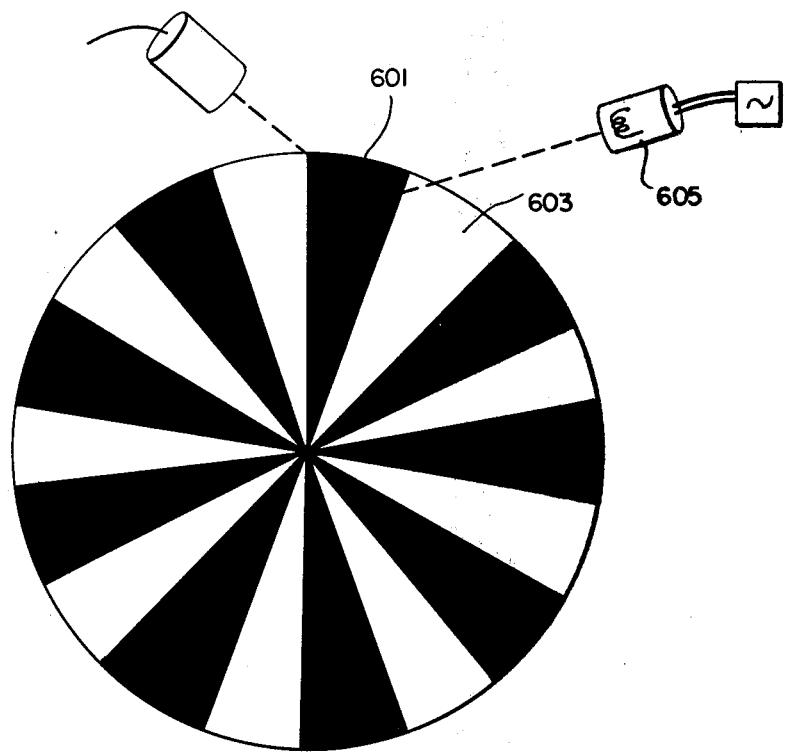
Figure 10:
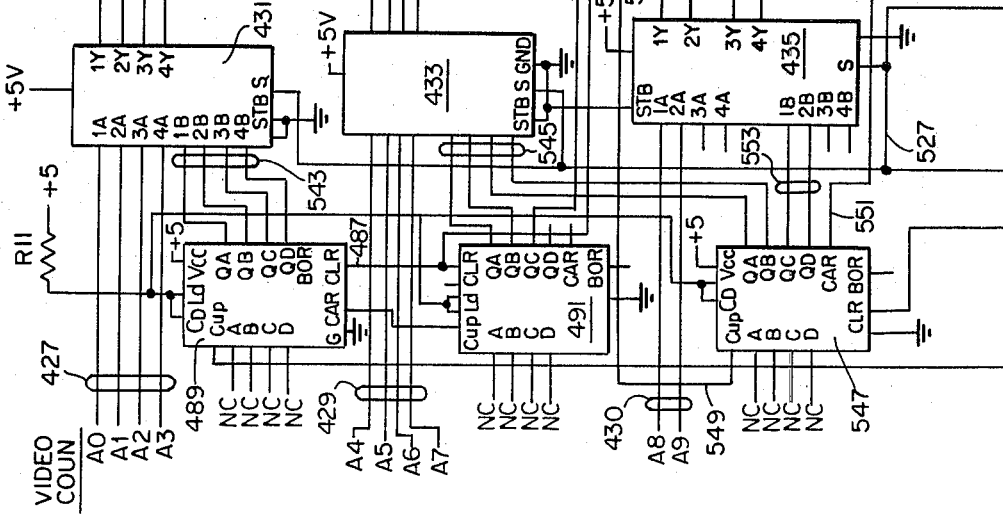
Figure 11:
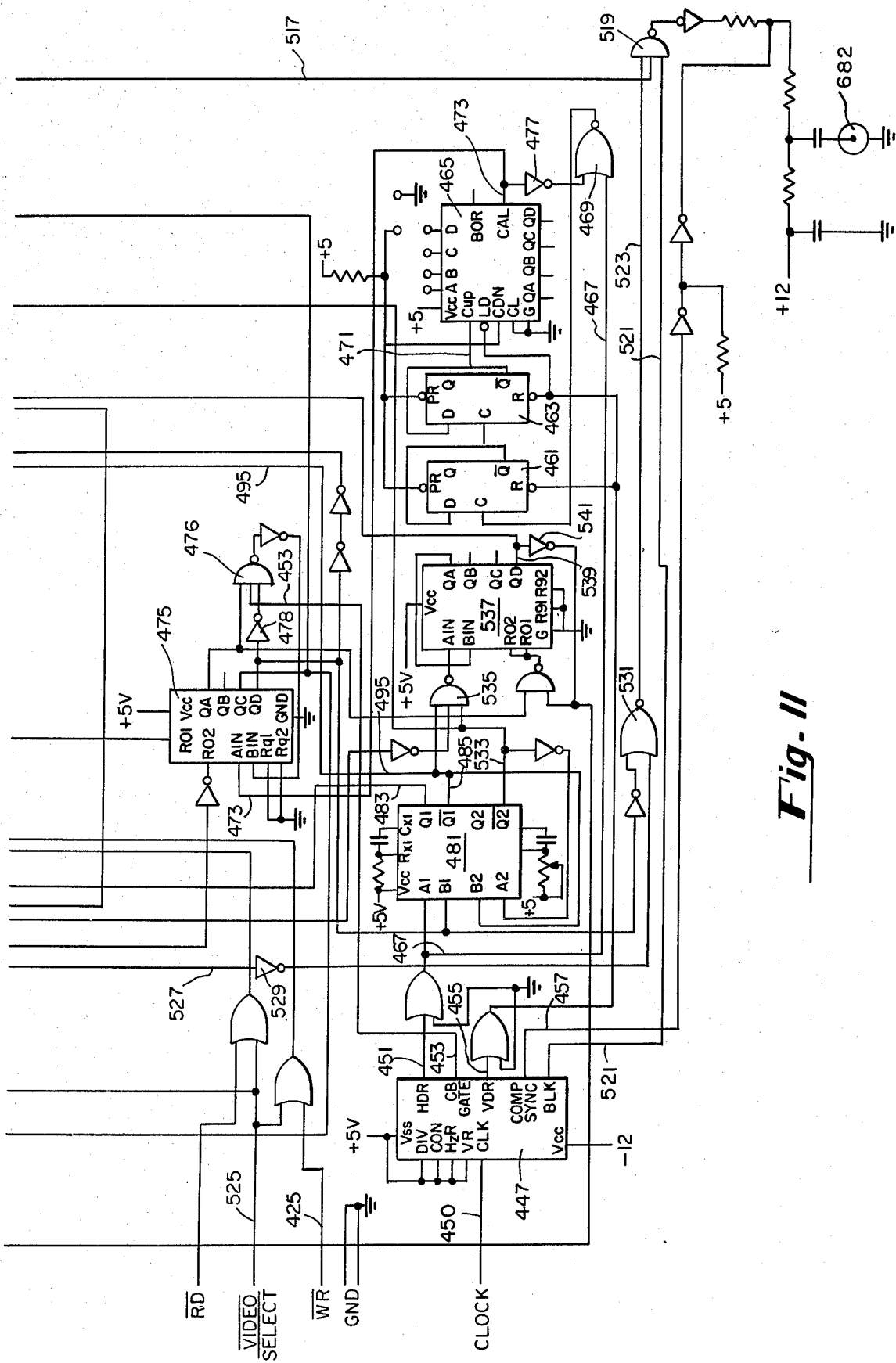
Figure 13:
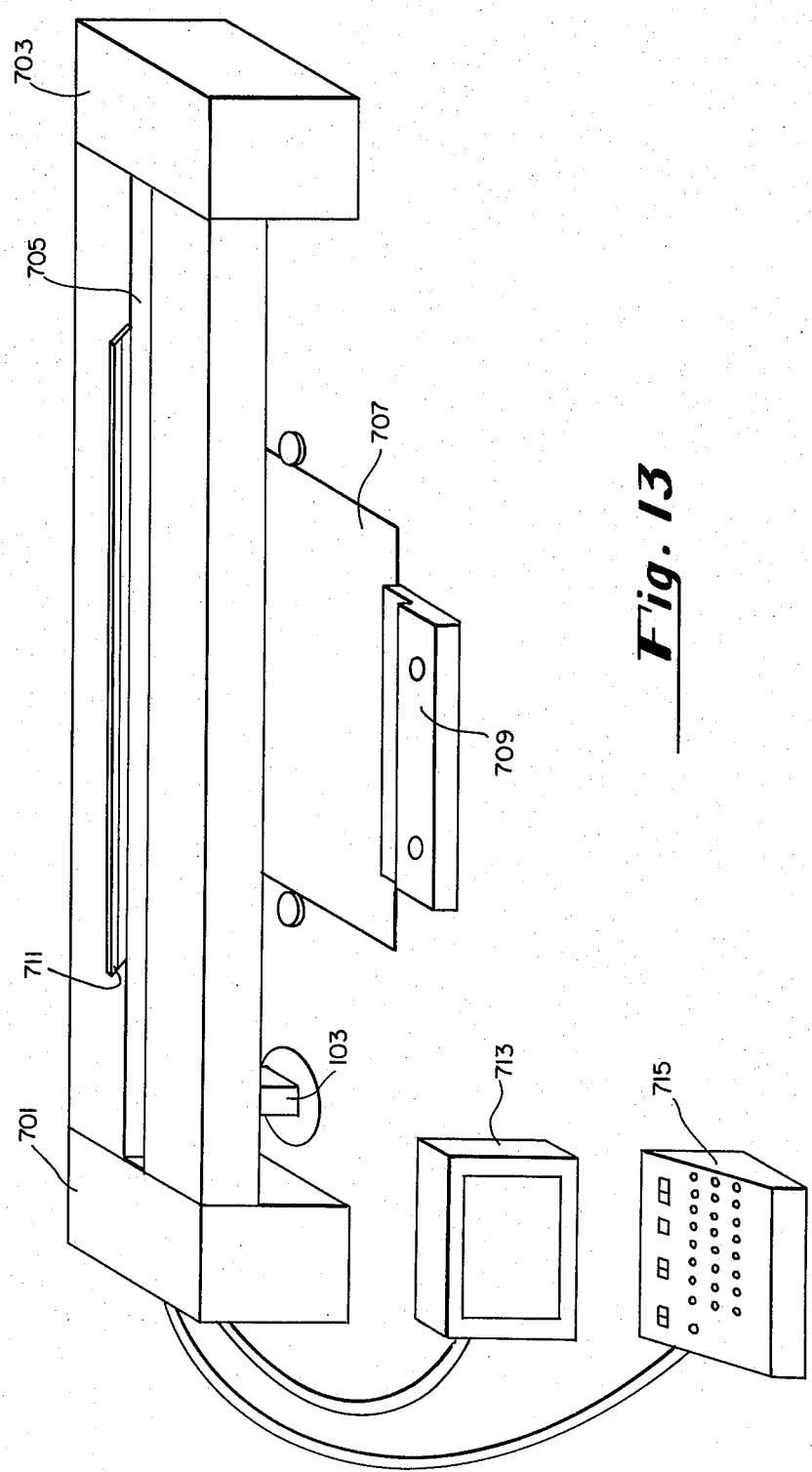

FIGS. 6 and 7 when laid out as shown in FIG. 8 represent a wiring schematic of the major part of the system;

FIG. 9 shows the clock pulse generator of the fan of the drive motor;

FIGS. 10 and 11 when laid out as shown in FIG. 12, represent a wiring schematic of the video control circuitry; and FIG. 13 shows a pictorial view of the overall system In the printing trade, when a pattern is printed there is also printed a plurality of color swatches along the horizontal dimension of the copy if one considers that the vertical dimension extends from the paper feed device toward the roll of paper being fed. The color swatches make up a bar or line and represent a number of color swatches, with some swatches of the basic colors and a number of swatches which are blends of the basic colors. If we examine FIG. 2, we see such a color swatch line. In FIG. 2 certain of the swatches are labelled C, M, Y and K, representing cyan, magenta, yellow and black. Where the basic colors have been overlaid the swatches are marked with a B indicating blend. Some such examples are the swatches 11, 13 and 15. From FIG. 2 we can determine that the swatch bar lies along the horizontal dimension of the copy since the copy is fed into the printing press in a direction indicated by arrow 17.

As the partial printing takes place by printing dots of the basic colors, there will be ink fed to a printing plate of some kind and this ink will be transferred to the copy at different locations along the horizontal dimension. Since the blended areas are made up of dots of the basic colors (cyan, magenta, yellow and black) it has been determined that if the user monitors the basic colors then he can be relatively certain that the blended colors will stay consistent. It can be seen in FIG. 2 that there are a number of swatches which have basic colors and in actual practice there would be many more than shown in the example of FIG. 2.

In FIG. 2 it will be noted that there is a yellow swatch 19, a magenta swatch 21, a cyan swatch 23, another cyan swatch 25, a magenta swatch 27 and a black swatch 29. It will be noted in FIG. 2 that opposite the swatches identified by odd numbers 19 through 29, there are black marks such as the black mark 31.

When the user of the present system is going to effect monitoring a copy, he takes a black felt pen or some other means and produces marks such as the marks identified by odd numbers 31 through 41 and locates those marks as close to the middle of the swatch as he is capable of disposing the same. The marks lie opposite the basic color swatches. In the initial use of the present system, the scanning head which is shown in FIG. 1 is caused to travel over the black marks identified by odd numbers 31 through 41 and as will be explained hereinafter, the head records the location of each of those black marks so that at a later time when the color swatch bar is scanned only the swatches identified by odd numbers 19 through 29 will be read.

Before getting into the overall system, examine FIG. 1 which shows the read head in a pictorial schematic arrangement. The read head 103 is the subject of my U.S. Pat. No. 4,239,393 entitled, "Optical Density Scanning Head". In the read head there is a light source 43 from which there is a column of light passing through the lenses 45 and 47 to be focused at a point 49 on the copy. The light will bounce off or be reflected from the point 49 in all directions and some of said light energy will pass through the filters 51, 53 and 55. If we assume that the filter 51 and the photo sensitive device 57 make up the photo sensitive-filter arrangement for detecting the basic color cyan, then the filter 51 would be a red filter which would pass only red light (a red filter represents the frequency band of light that cyan primarily absorbs). Accordingly, only a very small amount of light would pass to the photo sensitive device 57 if in fact the color of the copy at point 49 is cyan. In like manner if the photo sensitive-filter arrangement made up of the filter 53 and the photo sensitive device 59 is the arrangement to detect the basic color magenta, then the filter 53 would be a green filter and if magenta were the color of the copy located at point 49 then only a very small amount of light energy would pass to the photo sensitive device 59. Finally, if the filter 55 along with the photo sensitive device 61 are considered to make up the photo sensitive-filter arrangement to detect yellow then the filter 55 would be blue and if the color of the copy at point 49 were yellow, then very little light energy would pass to the photo sensitive device 61. If the color at point 49 were black then an equal but small amount of light energy would pass to each of the photo sensitive devices 59, 61 and 57. In the preferred embodiment a photo sensitive device consists of a silicon diode connected to an operational amplifier which in turn has a decode or transistor in a feedback circuit to produce a logarithmic response. These devices provide output signals which have logarithmic relationships to the intensities of light applied thereto. It should be understood that certain colormeter systems would not necessarily employ photo sensitive devices which provide output signals with logarithmic relationships to light intensities and although such systems may not be technically identifiable as a densitometer, the present invention could be used therewith.

The circuitry employed with the head, as shown in FIG. 1, provides that if there is a relatively small electrical signal generated for instance by the photo sensitive device 57, then there would be a large electrical signal output on the line 63. If the output signal on line 63 were larger than the signals on lines 67 and 65, it would indicate that the color which was being detected was cyan. In a similar manner, if the color were magenta, there would be a relatively large signal on line 65 and if the color were yellow, there would be a relatively large signal on line 67. As will be explained hereinafter, the signals on lines 63, 65 and 67 are transmitted into a multiplexer device, therefrom to a digitizer, and therefrom into a microprocessor whereat they are compared to one another to determine which is the largest signal whcih in turn enables the system to determine which color swatch the head is scanning. In other words, when the head is looking at a swatch, for instance a swatch of magenta, there would be some light energy being passed to each of the photo sensitive devices 57, 59 and 61. Since the red light and blue light would not be absorbed by the magenta swatch and would pass through the filters 51 and 55, there would be a relatively large amount of light striking the photo sensitive devices 57 and 61 and the output signals on lines 63 and 67 would be relatively low compared to the signal on line 65. After the output signals have been digitized and transmitted to the microprocessor, the microprocessor determines (by comparing each of the output signals with every other output signal) that the signal on line 65 is the largest signal and therefore a decision is made by the system that the head is viewing a swatch which is predominantly magenta in color. The sorting and comparison is designed to be part of the internal operation of the microprocessor and per se is not the present invention.

Figure 4:
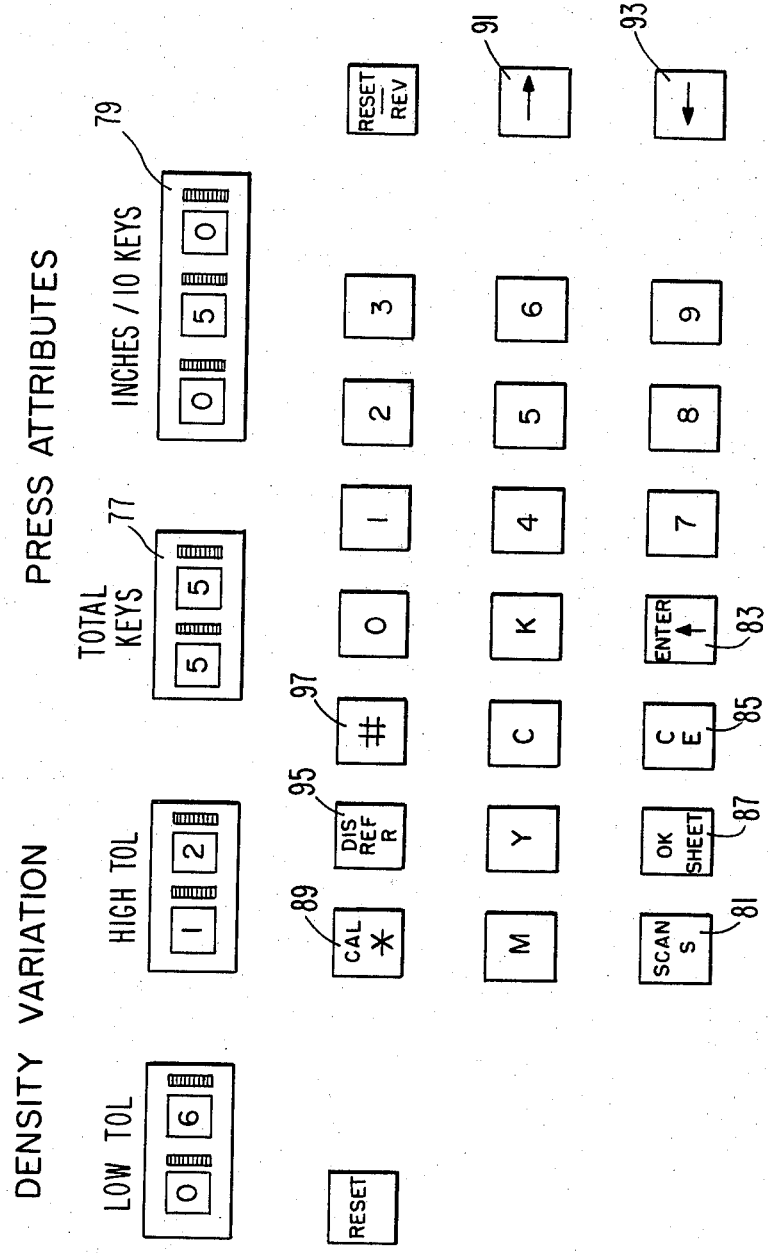
FIG. 4 is a layout of the console piece.

In FIG. 4 we see an arrangement of the keys on the console. It will be noted that on the upper left hand side there is a designation Density Variation and that designation applies to the two sets of thumb wheels lying thereunder which are labeled Low Tol meaning low tolerance and High Tol meaning high tolerance. Bear in mind that for each point of detection, shown by the black marks 31, 33, 35, 37, 39 and 41 in FIG. 2, there will be entered into the system the desired optical density value for the respective colors at those locations. As will be discussed later, the yellow at position 19 (FIG. 3) may have a desired optical density of 1.20 and an actual optical density of 1.23, as shown by the first column of numbers on the left hand side of FIG. 3 under bar 99. The desired optical density is not shown on the display of FIG. 3 but the optical density which has been read (i.e. the optical density of 1.23) is shown. In so far as the display of FIG. 3 is concerned the Low Tol setting and the High Tol setting relate to the generation of the "bar" configurations of FIG. 3 and their meaning to the user of the system. The Low Tol value is a setting by which the user tells the system that if the optical density of the ink being read does not deviate (in either a positive or negative sense) from the desired optical density (very often called the reference density) by an amount in excess of the Low Tol value then the bar, generated for that reading, will be located in the center of line 101 as exemplified by bar 99. This condition represents a most acceptable optical density. However is the value of the optical density of the ink being monitored exceeds the reference density by an amount greater (in an absolute sense, i.e., in either a positive or negative sense), than the Low Tol, then there will be a bar pattern shown either above or below the line 101 as exemplified by bars 69 and 75 of FIG. 3. This condition represents a marginally acceptable optical density and alerts the user that a correction is probably in order.

If we examine FIG. 4 again we find a High Tol thumbwheel. The value set in High Tol represents the maximum deviation in value, (in an absolute sense) by which the optical density value, of the ink sample being monitored, must exceed the reference optical density before the system indicates a reject.

If the difference between the reference optical density value and the actual optical density value is greater (in either a positive or negative sense) than the value set in the High Tol thumb wheel, then a bar, such as the bars 71 and 73, is generated. The bars 71 and 73 are shown as hatched, indicating that they are blinking on and off meaning that the copy should be rejected. In discussing the tolerances we have indicated that the tolerances are values which are in excess of the reference value but it should be understood that they can be in excess thereof in an absolute sense, i.e. in either a positive or a negative way. In other words, if the standard value of optical density is 1.23 (shown as 123 on the video display) and the low tolerance is 0.06, as indicated in FIG. 4, and if the actual optical density is read to be 1.16 (which is 0.07 less than the reference), then 1.16 would exceed the low tolerance in a negative way and this would provide a bar such as the bar 75. On the other hand, if the reference optical density were 1.23 and the actual reading were 1.30, then the optical density would exceed the low tolerance in a positive way and would give rise to the generation of the bar 69.

If we again examine FIG. 4, we find in the arrangement of the console, on the right-hand side, a section identified as Press Attributes. Note that under the Press Attributes, there is a Total Keys thumb wheel 77 wherein the total number of ink flow keys on the printing press is set by the thumb wheel. An ink flow key in this teaching is a reference to a thumb screw which moves a doctor blade in or out (toward or away) from an ink roller. This arrangement permits more or less ink to be transferred to the copy. There are a number of such ink flow keys set adjacent to a long doctor blade in a normal press arrangement and by adjusting the positions of sections of the doctor blade inwards or outwards from the ink transfer roller, the flow of ink is controlled. In the present embodiment, we are showing a press which has 55 keys and hence 55 adjustment places on the doctor blade. Obviously, there could be other numbers of keys. As also can be gleaned from FIG. 4, there is a thumb wheel means which can be set to tell the system the inches per ten keys on the press and is designated as thumb wheel 79. It will be noted that the setting is for 5, meaning that for every five inches along the doctor blade, there are ten keys. By using the number of keys and distance per ten keys, the video display can be elongated so that full advantage of the screen can be taken into account. In other words, if there were only five keys on the printer extending over five inches and there were no opportunity to change the base scale, there would be a relatively small display on the video screen.

As can be seen in FIG. 4, there are a number of keys which can be depressed on the console. Note in the lower left-hand corner there is a key called "scan key," number 81. When a copy is to be monitored, it is located in the machine and the scan key is depressed and the enter key 83 is depressed, so that the command "scan" goes into the system. The scan command causes a motor to be energized thereby driving the head (through a belt system) along a path which causes it to scan or look at the color swatch bar or to look at the black markers lying along side of the bar swatches as earlier described. If the user has made a command entry, by depressing the key 83, and he should change his mind, he depresses the CE key 85 which clears or erases the entry. If the user decides to use a particular copy as a reference, then he would insert that copy or sheet into the scanning position, depress the "OK sheet" button 87 and then the enter button 83. This operation would cause the read head to scan the color swatch bar and put into the microprocessor memory the values of the basic color swatches that were read. If it should happen that the optical density, read by the system, indicates that it is a certain value but the user knows that the swatch bar, which was read, actually has a different optical density and therefore the value presented on the video is incorrect, then the system can be calibrated. To calibrate the system, the Cal Key 89 is depressed, followed by depressing the enter key 83 and the head can be moved in either the forward direction by key 91 or the reverse direction by key 93 to have it located over a color swatch which was read incorrectly. When the head is located over the swatch to be read, the gain and the "level" of each color channel of the read head output can be changed so that the video display indicates the optical density which the user knows is present at the color swatch being read. Normally when the system is operating in a scan mode, the head is passed over the swatches on the bar and the actual optical density is also displayed on the video. If the user wants the system to display the reference densities, then the Dis Ref key 95 is depressed, followed by the depression of key 83 and the reference densities will be shown on the video display in the positions whereat the particular color swatches are indicated as being read. In other words, looking at FIGS. 3 and 4, if the keys 95 and 83 were depressed then the reference optical density for yellow would appear at the location (FIG. 3) represented by optical density value 123, while the reference density for magenta would appear at the locations represented by the values 116 and 110 and the reference density for cyan would appear the value locations 111 and 118.

If it is desired to assign a particular optical density to a specific color swatch, then the key 97 is depressed, followed by depression of the ink flow key location (from the numbered keys), such as 105 (meaning ink flow Key location 10.5) followed by the desired density value, followed finally by Key 83. Actually there would be an ink flow key at 10 on the printing press and an ink flow key at 11 on the press but the yellow (by way of example from FIG. 3) is being transferred to the copy between ink flow keys 10 and 11. The optical density reference information would be entered into the system and would be the reference against which any future readings of the yellow at the 10.5 Key location would be read. Obviously, the same procedure is true for the other colors to be monitored.

Returning to an examination of FIGS. 2 and 3, we find that there is a reading of yellow (location 19 of the swatch bar) which is within the tolerance, and this is shown by having the bar 99 located equally on either side of the base line 101. Under the bar 99, it will be noted that there are three vertical numbers 105, representing ink flow key 10.5, followed by "Y" for yellow which corresponds to position 19 in FIG. 2, followed by the numerals 123 indicating the optical density of yellow actually being read. It should be noted that the decimal points are not shown on the video for simplicity. Since the optical density 1.23 generates the bar 99 in an acceptable position, then it can be assumed that optical density 1.23 is very close to the reference optical density for yellow.

Figure 5:
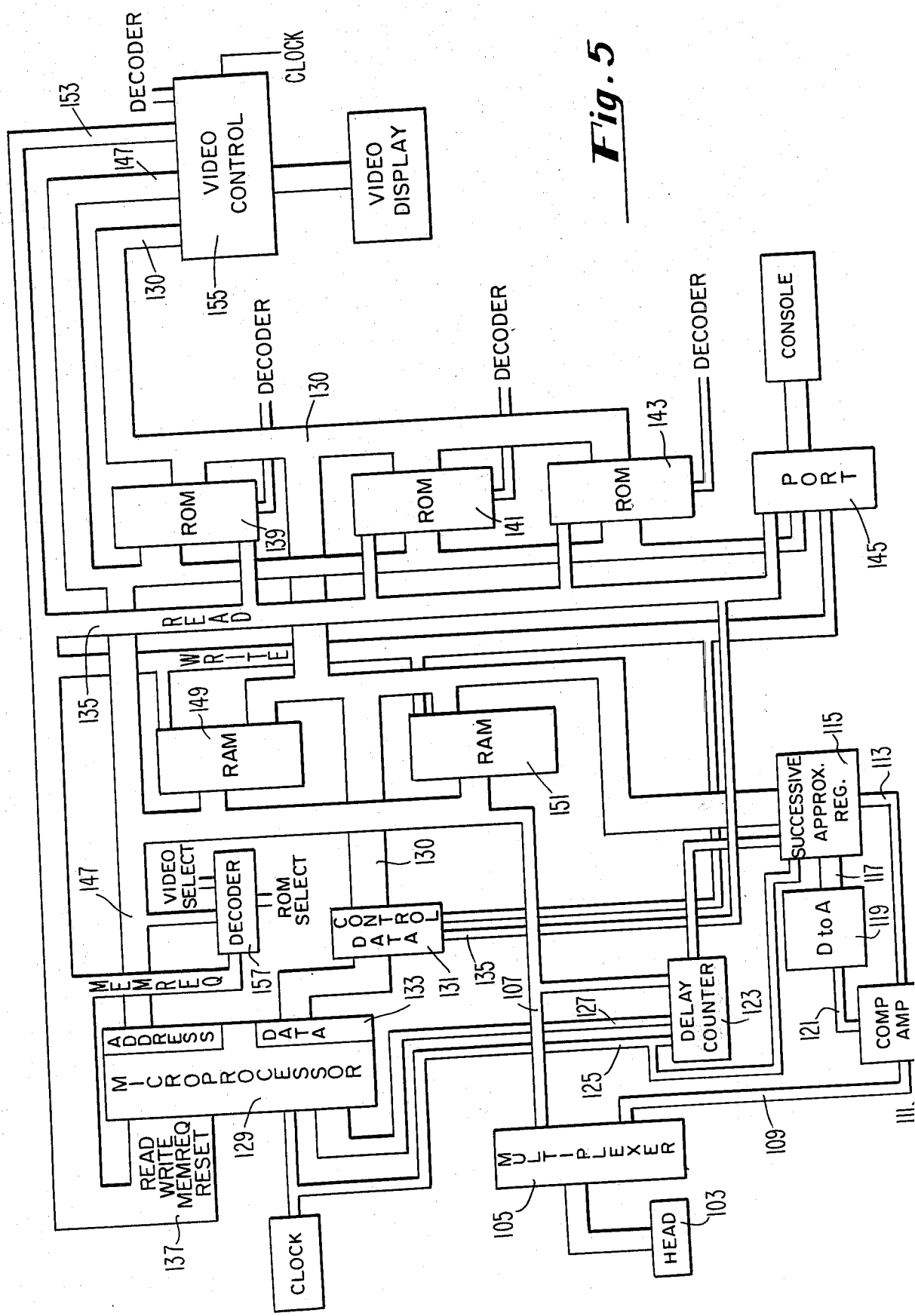
FIG. 5 is a block diagram of the system.

Consider now FIG. 5 which is a block diagram of the overall system. In FIG. 5, there is shown the head 103 which was described earlier in connection with FIG. 1. It was mentioned earlier that the head 103 provides three signals representing respectively the cyan, magenta, and yellow optical density values. These three signals are transmitted to the multiplexer 105. The multiplexer 105 is, in the preferred embodiment, manufactured by the RCA Corporation and is designated as a CD 4051AE. It should be understood that other types of multiplexers could be used. The multiplexer is activated by signals from the microprocessor 129 which are transmitted on the address lines 107. When the correct address signals are present on the address lines 107, the multiplexer causes the signals from the head 103 to be transmitted along the common line 109 to the comparator amplifier device 111. Actually the comparator amplifier device 111 is circuitry composed of an operational amplifier whose output is fed into one leg of a comparator. The output from the comparator is transmitted along the line 113 to the successive approximation register 115. The successive approximation register in the preferred embodiment is manufactured by the National Semiconductor Corporation and is designated as the DM2502C. It should be understood that other types of successive approximation registers could be used. The successive approximation register (hereinafter SAR) in an orderly fashion develops a digital output signal, though a loop including a D/A converter and a comparator which digital signal is a digitization of the input signal to the comparator. The digital to analog converter 119 (hereinafter DA 119) in the preferred embodiment is manufactured by the Motorola Company and is designated as an MC1408L8, but it should be understood that similar D/A converters could be used. From D/A 119 there is a feedback circuit on line 121 which transmits the analog signal back to comparator amplifier. When the input signal on line 109 is equal to the analog signal on line 121, there ceases to be any further input on line 113 into the SAR and hence the signal representing the value of the optical density of the color being scanned by the head is digitized. When the system is in a scan operation and therefore the system is going to accept readings from the head, there is a command transmitted to the delay counter 123 from the address signal lines 107. In addition, there is a clock signal transmitted on line 125 as well as a further control signal on line 127 from the micro-processor in order to initiate the operation of the delay counter. The function of the delay counter 123 is to cause the micro-processor 129 to wait, or delay its operation, until the signals from the head 105 have "settled down." In the preferred embodiment the micro-processor is delayed for three clock counts. When the three clock counts have been completed as will be explained further hereinafter, the micro-processor will be further delayed by the digitzer until the number has been digitized so that the micro-processor will be permitted to carry on with the program.

The signals from the head, which have been digitized in the SAR 115, are transmitted on the data lines 130 through the data control device 131 into the data entry section 133 of the micro-processor 129. At this time, there will be a control in the data control device 131 in response to the READ control signal on line 135. The READ command comes from the micro-processor on the lines 137, and then is transmitted along the lines 135 to the ROMS 139, 141, and 143 as well as to the port device 145. The data control device 131 is an integrated circuit that includes a plurality of controllable solid state switches that permit two-way traffic for the data and in the preferred embodiment are part of an integrated circuit manufactured by National Semiconductor Corporation and designated 81LS95. The ROMs 139, 141, and 143 are read only memories manufactured by the Intel Corporation and designated as a 2708 device. Obviously, other forms of read only memory devices (ROMs) could be used. The port device 145, mentioned earlier, is an integrated circuit manufactured by Intel Corporation and is designated as M8255A and, obviously, other forms of port devices could be used. The micro-processor device 129, mentioned earlier, in the preferred embodiment is manufactured by the Mostek Company and is designated as MK 3880.

In the micro-processor 129 the data from the SAR 115 is first sorted, that is each signal is compared one against another until a decision is made as to which is the largest. Since each channel from the head has a particular color designation and since the channels are scanned in a predetermined way, the microprocessor 129 (when it has decided which data has the greatest value) will have made a decision as to which color is being scanned by the head. The sorting operation and the comparison operation are accomplished by logic circuitry which is internal to the microprocessor along with a suitable program and therefore is not described in detail in this description. Obviously other forms of logic circuitry could be used.

It normally follows in the operation of the present system that when the microprocessor 129 has determined the color which is being observed or read it is compared against the reference value stored in the system. The foregoing is accomplished by having the microprocessor call for, or fetch from, the random access memory (hereinafter RAM) the reference value to be compared with the actual value being read to determine whether or not the read value is within the tolerance described earlier in connection with the description of FIG. 4. Actually the reference value is fetched from RAMs 149 and 151 by sending address signals on lines 147 to the RAMs. In response, the RAMs 149 and 151 send data on the lines 130 through the data control means 131 into the data section 133 of the microprocessor 129. The microprocessor effects a comparison between the reference value (data sent) received and the actual reading. The difference between reference value and the actual value is held in a register in the microprocessor while a further command from the program counter fetches the tolerance values from the proper location in the RAMs 149 and 151. The data from the RAMs 149 and 151 is transmitted, as the data before, over lines 130, through the data control means 131 into the data section 133 of the microprocessor 129. Accordingly, the tolerance values are compared with the difference between the reference value and actual value. If the difference exceeds the minimum or maximum tolerance then signals are sent to the video circuitry and the video display will show bars such as bars 69, 71, 73 and 75 of FIG. 3 depending on whether the minimum or maximum tolerance has been exceeded. The RAMs 149 and 151, in the preferred embodiment, are manufactured by the Intel Corporation and are designated as 2114. Obviously, other forms of RAMs could be used.

It will be noted in FIG. 5 that the READ and WRITE control signals are transmitted along lines 153 to the video control circuitry 155. The address signals from the microprocessor 129, mentioned earlier, are transmitted on lines 147 to the video control circuitry 155. The data signals on lines 130 are also transmitted to the video control circuitry 155. The video control circuitry of the preferred embodiment is shown and discussed in more detail hereinafter, but it can be any form of circuitry normally used with a video display, which circuitry is well known in the video art. Shown in the block diagram of FIG. 5 is a decoder 157 which has an output to the video select and to the ROM select. Actually, the decoder is a means which takes a portion of the output from the address circuitry and provides signals to select a particular ROM rather than all of the ROMs and provides a control signal for the video circuitry.

Consider now FIGS. 6 and 7 as laid out in FIG. 8. In FIGS. 6 and 7, the microprocessor 129 is shown in some detail. It should be understood that there are many features of the microprocessor 129 which are not employed in this particular system. The only commands or request signals that are employed with this particular microprocessor are those shown starting from the top: the write command signal on line 161; the read command signal on line 163; the memory request signal on line 165; the reset signal on 167; the machine cycle one command on line 169; the input-output (I/O) request signal on line 171; the interrupt signal on line 173; and the wait signal which is received on line 175. Obviously, many programs can be effected with a microprocessor such as the microprocessor 129 in conjunction with the various ROM and RAM memory devices previously mentioned in connection with description of FIG. 5. For purposes of this description, we will not attempt to delve into the various software programs that can be effected with a microprocessor. We will only describe the operation of the microprocessor 129 in conjunction with the other circuitry shown in order to effect: a reading of some color swatches; a sorting and comparison of that information; and finally, a display of that information so that the user can decide what color the scanning head is reading and whether or not a correction of the ink flow or the application of the color bearing material should be made.

When the power is first turned on, the clock pulse generator 150 commences generating clock pulses on lines 152 and 154. When the operator starts to use the system, he depresses both of the reset buttons shown in FIG. 4 and this effects a signal to the line 167 of the microprocessor which forces the program counter therein to be set to zero and initalizes the central processor unit of the microprocessor. The initialization of the central processor of the preferred embodiment microprocessor disenables an internal interrupt enable flip-flop so that an interrupt can not be initially effected, and sets the program counter to zero.

The program counter is advanced by the clock pulses from zero through a number of steps and the instructions generated in response thereto accomplish a number of "housekeeping" matters. After the "housekeeping" is completed, the program counter reaches a point where the program calls for a subroutine or loop which enables the system to await an instruction from the console. Assume that the user enters the value of the optical densities that he wishes as reference values for cyan, magenta, yellow and black. He does this by depressing the C key 90 in FIG. 4, followed by three depressions of numeral keys such as 1, 1, 5 (meaning 1.15) and the enter key 83. He goes through a similar routine for each of the other three colors with proper reference values entered of course. Next, assume that the user wants to effect a scan of the markers identified by odd numbers 31 through 41 in FIG. 2. The user depresses the scan key 81 and the enter key 83 which causes the head 103 to scan along a track or path over each of the markers identified by odd numbers 31 through 41. The markers identified by odd numbers 31 through 41 are generally between ⅛ and 1/16 of an inch wide, in the preferred embodiment, and the number of shaft pulses (which will be explained hereinafter) generated during the head's excursion over the mark is between 15 and 45. Obviously if another motor were used the number could vary. In the preferred embodiment if the number of pulses detected (during the head excursion) is less than 15 or greater than 45, the system recognizes that the detected signal has not been produced by a valid black mark.

The determination of whether a mark is truly a black marker is accomplished, (1) by having the read head indicate that it is reading black, (2) by having the microprocessor examine certain locations in memory and determine that a value had not been entered and (3) by continuing to read black for no greater than 45 shaft pulses. If those conditions are met then the number of shaft pulses, indicating where the black marker was first read, is placed in a particular location in a RAM for later use. The scanning head is carried by a belt. After the scan command is entered from the console, the drive motor is started and the belt (which is coupled to the drive motor) moves to carry the scanning head. After the head has moved a certain distance (to take the slack out of the gears and belt), the head passes a start position whereat it interrupts a light beam to produce a signal to start counting shaft pulses. In the preferred embodiment there is a wheel secured to the bottom of the drive motor shaft which has segmented black and white marks thereon as shown in FIG. 9. The black and white segments 601 and 603 are rotated past a lamp 605 which is disposed to bounce light off the white segments to provide shaft clock pulses. The speed of the motor is many times greater than the speed of the shaft and there are about 200 shaft pulses per inch of travel of the head. The clock pulses so generated cause signals on line 174 to set flip-flop 177 and provide a low signal on line 173. The interrupt signal is acknowledged by an $\overline{m1}$ and the I/0 RQ signals which reset the flip-flop 177 to await the next shaft clock signal.

The interrupt signal (produced with every clock pulse) causes the current value of the program counter to be stored for later use and causes the program to jump to a routine whereby, the data from the shaft clock pulse memory location is brought to the microprocessor, incremented by one and returned to memory. If the head sees black, then the value of the shaft count is not only incremented and stored but the first value of the shaft clock pulses after reading black is held in another memory location in the microprocessor. Thereafter, the shaft clock pulse value is incremented with each shaft clock pulse and when the head no longer reads black, the value in the RAM is compared with the value stored in the other location. If the difference is no greater than 45, then the reading of the black is considered to be a reading of a good mark and the value in the register is transferred to a particular RAM location to be used at a later time when the system scans swatches. The difference of course is compared with the stored acceptable values of difference. If the difference were greater than the acceptable value then the system would generate an error signal and the user would have to set the procedure up again.

While the value in the register may have been transferred to a RAM, the overall count of the shaft pulses continues. When all of the markers have been determined and their locations (number of shaft pulses) stored in the RAMs, then the head is returned to its home position to await further instructions.

When the user implements a scan of the swatch bar he depresses the scan key and enter key. The system examines the RAM and finds that information has been entered and thus determines that this scan is a scan of the swatch bar. In this operation, under the direction of the program, the shaft clock pulses are stored, fetched and incremented to effect a count thereof. Upon each fetch operation this value is compared with the value of a marker location. When the comparison shows a match, the head will read the reflected light to determine the color of the swatch and its optical density. This information will be stored in another particular location in the RAMs. As was mentioned earlier, the three values of the color as represented by signals from the scanning head are compared one with another and the greatest value is considered to be indicative of the color of the swatch. The information is stored for later use in the video display.

Let us consider in more detail the circuitry to accomplish the foregoing operation. Bear in mind that the ROMS are carefully loaded with instructions to accomplish the desired data processing by directing the microprocessor with said instructions.

As the program counter of the microprocessor steps through its numbers, certain address signals are generated at the terminals A0 through A9 and these address signals are transmitted on the cable 179 to the RAMS 149 and 151 as well as to the ROMS 139, 141 and 143. Since the address signals are sent to the many memories, it is necessary to select which memory device is requested by the program. The data to make that selection is by a predetermined arrangement part of the address and the selection is made through the decoder 157.

Some of the address signals are transmitted on the cable 181 to the decoder 157. There would of course be a memory request instruction generated by the program and it provides a signal to the OR gate 183 and therethrough to the input terminal 185 of the decoder 157. Otherwise, the address generated at A13 is transmitted through the OR gate 183 input to the input terminal 185 of the decoder 157. In the decoder 157, the signals at positions 185, 187, 189 and 191 form a coded signal input to provide an output signal on one of the output signal pins in order to select simply one of the memory devices. In other words, if all of the values on the lines 185, 187, 189 and 191 were zero, then the line 193 would be energized and a signal would be sent along line 193, through the OR gate 197, to select the ROM 139. Accordingly even though the address signals were sent to the RAM 149 and the RAM 151 as well as the ROMS 141 and 143, only the ROM 139 would respond to the address signals. In a similar way the lines 201, 203, 205, 207, 209 and 211 are selected so that the proper memory unit or video circuitry or spare select lines 144 can be specifically selected.

When the proper address signals are accepted by the selected memory unit, that memory unit transmits output signals on the data lines 130. Signals being transmitted on the data lines 130 are transmitted to the switches identified by odd numbers 213 through 227 in order to transmit information into the microprocessor 129. Information coming from the microprocessor 129 is transmitted through the switches identified by odd numbers 229 to 243. The switches identified by odd numbers 213 through 227 and switches identified by odd numbers 229 through 243 along with gates 245 and 247 are part of an integrated circuit as mentioned connection with the description of FIG. 5. Switches identified by odd numbers 213 through 227 are controlled by the output signal of and gate 245, while the switches identified by odd numbers 229 through 243 are controlled by the output of AND gate 247. It will be recalled from the description of FIG. 5, that there were read and write command signals controlling the data circuitry. The read and write command signals are respectively transmitted through the gates 245 and 247. Accordingly, if there is going to be a write operation in effect, then the data should be transmitted from the microprocessor 129 through the switches identified by odd numbers 229 through 243, and these switches are controlled by the output of gate 247 which is further controlled by the write command signal on line 161. On the other hand, the read signal on line 163 is transmitted to the AND gate 245 to permit data information to be fed into the microprocessor.

The operation of the ROM memories 139, 141 and 143 in response to the address signals being transmitted thereto (on the left-hand side) and data signals being transmitted therefrom (on the right-hand side), is similar to the above described operation and is obvious to any one skilled in the art and therefore no further explanation thereof is deemed necessary.

The delay circuit mentioned in connection with the description of FIG. 5 is shown as being made up of the flip-flops 249, 251 and 253. It should be borne in mind that the purpose of the delay circuit is to cause the microprocessor to "wait", i.e., suspend functioning, while the analog signals from the multiplexor 105 become digitized. The delay is accomplished by initially activating flip flop 249 to provide a control signal which causes the microprocessor to start its "wait" period. Thereafter the system sequentially activates flip flops 251 and 253 to provide two control signals which when present with a third signal will direct the microprocessor to terminate its "wait" period. Finally the system generates a signal from SAR 115 which provides the third control signal just mentioned and the microprocessor terminates its "wait" period.

When the read head is generating signals, which are transmitted on the lines 255, 257, and 259 to the multiplexer 105 there is an I/0 Request Signal generated on line 171. This I/0 RQ Signal is transmitted through the buffer 261, along the line 263, to the inverter 265. A low signal into the inverter 265 becomes a high signal and is transmitted along line 268 to the D input of the flip-flop 249. Accordingly, when the first clock pulse is transmitted on line 269 to the flip-flop 249, the high signal at the data (D) input will cause $\overline{Q}_1$ to go high and therefore $\overline{Q}_1$ high is transmitted to the gate 273. The high signal input into the gate 273 causes a low signal input to the inverter 275 and the low signal being inverted once again by the inverter 275 provides a high signal input to the D entry of the flip-flop 251. At the same time, that high signal is transmitted to the NOR gate 277. The NOR gate 277 provides a low signal output therefrom if both of the input signals thereto are high and provides a high signal therefrom if one of the input signals thereto is low. NAND gate 279 provides a high output signal therefrom if one input signal is low. Since at the first clock pulse time, the signals from $\overline{Q}_1$ of flip-flops 251 and 253 are low (and the EOC signal is low after passing through the inverter 274), then the output signal from the NAND gate 279 is high. Therefore, there is a low signal on line 281 (after the signal passes through NOR gate 277). The low signal on line 281 which is transmitted back to the "wait" position of the microprocessor 129 and keeps the CPU in the wait condition.

At the next clock pulse, the flip-flop 251 causes the $Q_1$ output to go low and therefore the $\overline{Q}_1$ to go high. However, at the same time, $\overline{Q}_1$ of the flip-flop 253 is low, which keeps the output from the AND gate 279 high thus continuing a low signal on line 281 to the "wait" input of the microprocessor 129.

When the third clock pulse arrives, the flip-flop 253 has its Q output go low and its $\overline{Q}$ output go high, so that two of the inputs to AND gate 279 are high and the condition of the EOC signal becomes controlling. The purpose of the initial delay is to permit the signal from the multiplexer to "settle down." When the EOC signal becomes low and inverter 274 becomes high, the NAND gate 279 is fully conditioned to provide a low signal to the NOR gate 277. Hence, if the EOC is low the output signal from the NOR gate 277 goes high and the wait condition is removed from the microprocessor 129. However, the low signal to the NOR gate 277 cannot be developed unless there is a low signal from the EOC output 283 of the SAR 115. The low signal output from the EOC only occurs when the SAR has been advanced through a complete set of steps, that is, when the SAR has fully digitized the signal that has been transmitted thereto and all of the digitized steps have been taken. Of course, it is only at this time that the system wants the microprocessor to stop waiting because the purpose of having it wait is to effect the digitizing. The SAR 115 requires eight clock pulses to complete the digitization. The multiplexing operation is effected by providing the correct address signals on the lines 285, 287, and 289, and 291. When the proper address signals are transmitted thereto, then one step at a time the signals on the lines 255, 257 and 259 are transmitted out the common line 293 to the operational amplifier 295. Bear in mind that each of the channels of lines 255, 257, and 259 is associated with a different basic color and therefore by scanning these lines in an orderly way, the microprocessor is aware that the data it is receiving is, for example, the optical density of a magenta swatch. The output signals from the operational amplifier 295 are transmitted to one input 297 of the comparator 299. The output from the comparator 299 is transmitted to the SAR 115, and the digitized values are transmitted from the SAR back to the digital to analog converter 119. The analog signal is transmitted from the D/A converter 119 along the line 301. The signal on line 301 is added to the output signal from amplifier 295 and when the sum is approximately zero, there is no longer an output signal from the comparator 299. When that event takes place, the system considers that the signal which was originally on line 293 has been fully digitized by the SAR 115.

The output signals from the SAR 115 are transmitted along the lines 303, through the gates identified by odd numbers 305 through 319, back to the data lines 130 leading to the gates identified by odd numbers 213 through 227. The digitized information is therefore transmitted into the microprocessor and back therefrom if it is to be stored in one of the RAMS. The data information is never transferred directly from memory to memory or SAR to memory but always goes into the microprocessor and then back out to the memory. The bursts of digitized information, which represent the optical densities of the colors of the swatches being scanned, are held in registers in the microprocessor and/or in memory (depending upon the program) and these digitized values are compared one with another to determine which is the greatest.

The port device 145 is a means for getting information from the console into data form and into the system and a means to transfer signals to and from peripheral elements. Consider that the lines, identified by odd numbers 329 through 343 are connected to the keyboard and lines identified by odd numbers 347 through 351 are connected to the keyboard. Hard connections are made between any one of the lines identified by odd numbers 329 through 343 and one of the lines identified by odd numbers 347 through 351 when there is a depression of a key. However, the hard connection will have no effect unless the proper line 347, 349 or 351 is experiencing a low voltage. We find that if the key is depressed, we have a signal beginning at the five volt source 344, through the resisters, through one of the lines identified by odd numbers 329–343, through the key that has been depressed back along one of the lines 347, 349, 351 to the low voltage. By way of example, if the key connects the line 335 to line 347 and line 347 has been rendered low voltagewise by the port circuitry, then line 335 is rendered at low voltage. When this condition occurs, the signal output on the lines 353–367 would read 11101111 (with the most significant digit at the left), indicating that some particular key had been depressed. That information would be read back into the microprocessor along the data lines and it would cause an instruction to be generated. The microprocessor sends the instruction by sending out information as address signals and/or command signals. The data output from the port 145 is effected by having the proper control signals on the lines 369 and 371 as well as a signal on either line 373 or 375 depending on whether we are accomplishing a read or a write operation.

There are several other signals that are transmitted into and out of the port 145. The lines identified by odd numbers 329 through 343 are also connected through the thumbwheels on the console to lines 346, 348, 350, 352 and 354. The lines 346, 348, 350, 352 and 354 are also scanned by making each line zero or low voltage while the remaining lines are at one or high voltage. If information is to be gotten from the console keys, the microprocessor addresses the port looking for information from the console keys by serially applying to each of the lines 347, 349 and 351 a low (zero) voltage while applying to the remaining two lines a high (one) voltage. The same procedure is true in interrogating the thumbwheels accomplished by "zero" scanning the lines 346, 348, 350, 352 and 354. In this way, one of the lines identified by odd numbers 329–343 will be brought to a low (zero) voltage to transmit data information from the port. Lines 325 and 327 respectively send signals through the port 145 indicating that the head has reached its right limit or alternatively its left limit of travel. The signal on line 322 acts to turn the drive motor on. The signals on lines 324 and 326 turn on lamps which indicate that the system is operating. The signal on line 323 is the shaft clock pulse input.

Consider FIGS. 10 and 11 as laid out by FIG. 12 with the understanding that the combined FIGS. 10 and 11 show detailed circuitry for the preferred embodiment of the video control signals mentioned earlier in the description of FIG. 5.

When data is to be shown on the video display, it is transmitted along the lines 401 into the RAMS 403 and 405. Such data must pass through the gates or switches identified by odd numbers 407 through 421 and said switches are in turn controlled by the AND gate 423. One input to AND gate 423 is grounded and the other input comes from the write command signal on line 425, FIG. 11. This is the write command signal which was earlier described as being on line 153 in FIG. 5. Of course the data must be located in some particular address in the RAMS, and the address information is transmitted on the lines 427, 429 and 430 through the multiplexers 431, 433 and 435.

In the preferred embodiment, the multiplexers 431, 433 and 435 are manufactured by Texas Instruments Company and are designated as 71LS165. The function of the multiplexers will be further described hereinafter. It should also be understood that the RAMS 403 and 405 in the preferred embodiment are manufactured by Intel Corporation and are designated as C2114. The data input and output control circuitry, shown by the switches identified by odd numbers 407 through 421 and the AND gate 423, as well as the switches 437 through 444 and the gate 445, are part of an integrated circuit manufactured by the National Semiconductor Company and is designated as a 81LS95 and is very similar to the data control circuitry described earlier in connection with FIG. 6.

Considering now that the data to be shown on the video display is stored in the RAMS 403 and 405 at the particular addresses that it should be stored, let us study the operation of the video control circuitry.

In FIG. 11, there is shown a camera control signal circuit 447 hereinafter described as a CCSC which in the preferred embodiment is manufactured by National Semiconductor Company and is designated as MM5321. The clock signals which are generated by the clock described in connection with FIG. 6 are transmitted on the line 449 to the CCSC 447. The clock signals in turn cause horizontal drive signals (HDRS) to be generated on line 451 which HDR signals occur every time a horizontal line of the video display commences. There is also generated from the CCSC a color burst signal on line 453, and while the system does not use color, nonetheless this signal is used for timing purposes. In addition, there is a vertical drive signal (VDR) generated on line 455, a composite synchronization signal on line 457 and a blanking signal on line 459. All of these signals are well known in video control circuitry and their roles will be further described hereinafter.

In the preferred embodiment, the display provides for a 68 line margin above the information and a 60 line margin below the information. It has been determined that the top margin will be initially developed by 64 horizontal scans and hence there is a counter arrangement provided by the flip-flops 461 and 463 along with counter 465 to count 64 horizontal lines. The flip-flops 461 and 463 in the preferred embodiment are manufactured by the Texas Instruments Corporation and are designated as 74LS74 while the counter 465 is manufactured by the Texas Instruments Corporation and is designated as 74LS193. It should be understood that other forms of flip-flops and counters could be used. In order to have the counter just described count 64 horizontal lines, the horizontal drive signals on line 451 are used as the clock and they are transmitted along the line 467 to the NOR gate 469 and therefrom as a low signal to the input of the flip-flop 461. The flip-flop 461 in effect divides the signals by two, the flip-flop 463 in effect divides the signals by four, so that every fourth horizontal line there is an input to the counter 465 on line 471 and the counter 465 eventually counts 64 lines and produces a carry signal on line 473 at that time. The carry signal on line 473 is transmitted along line 473 to the input of the counter 475. The carry signal on line 473 is also transmitted through the inverter 477 through the NOR gate 469 and is returned as a high signal to the input of the flip-flop 461 and therefore terminates any further counting.

The system has now counted 64 horizontal lines to permit the margin to be developed but the system is not ready to permit the data in video form on the video screen because the system is not in synchronism.

Let us consider for a moment that, when the system is turned on, the counters 497, 475 and 547 are in unknown conditions as far as the binary readings of these counters are concerned. They are not reset to zero as part of the housekeeping routine. Instead, the system relies on the fact that a few full video scans will not be used for display anyway and during those scans the video circuitry can be synchronized. Irrespective of the binary count in counter 497 when the power is turned on, it will count or accumulate in response to the output signals from $\overline{Q}_1$ of the monostable multivibrator portion of the dual function device 481. When counter 497 has a count of sixteen therein it will provide a carry signal on line 449 as an input signal to advance counter 547. As we will see in a moment counter 497 provides a carry at the count of sixteen but it starts normally, from a count of eight so that for every eight HDR signals there is a carry signal. Since counter 547 counts to sixteen, it provides a carry output on line 551 for every 128 HDR pulses.

The carry output on line 551 resets counter 475 and the foregoing operation takes place sometime during one complete scan irrespective of where the counters were set initially. During the next scan, the 64 line counter made up flip-flops 461 and 463 and binary counter 465 is reset to zero by the VDR signal and then counts HDR signals to reach a count of 64. At that time, there is a carry signal on line 473 to counter 475 which causes $Q_A$ to go high. The high signal from $Q_A$ of counter 475 provides one signal to condition the AND gate 476. Since $Q_D$ of counter 475 is low but is inverted by inverter 478, there is a second high signal to condition the AND gate 476. Accordingly, the color burst (CB) signals, (which are high), appearing on line 453 pass through the AND gate 476 to advance the counter 475. Counter 475 is arranged so that its starting position is at $Q_B$ and hence, the first CB pulse causes $Q_B$ to go high. Now the CB pulses occur at the same time as the HDR pulses. Accordingly, on the second CB pulse into counter 475 (which is at the time of the 66th HDR signal counting from the first HDR signal that advanced the "64" counter), Qc of counter 475 goes high. The high signal from Qc is transmitted along line 678, through NOR gate 480 to cause counter 497 to load or jam whatever information is present on the left hand inputs into the counter. The left hand inputs of the counter 497 are controlled by the $Q_D$ output of counter 475 and at the second CB time $Q_D$ is low. Hence, a binary seven is jammed into counter 497. On the third CB pulse (at the time of the 67th HDR) Qc is still high and $Q_D$ is still low and nothing changes in counter 497, i.e., a binary seven is loaded therein. On the fourth CB pulse Qc goes low before $Q_D$ goes high and even though the input to the left hand side of 497 has changed it has no effect since there is no signal from NOR gate 480. The fourth CB pulse coincides with the 68th HDR pulse and the counter 497 is advanced to binary eight with the 68th HDR pulse. With a binary count of eight in counter 497 the inputs to lines 503, 505 and 507 of the character generator 509 are all zero which is part of the starting condition sought. On the second and third CB pulses $Q_c$ goes high to reset counter 547 to zero which is another starting condition sought. Further it should be noted the Qd high blocks any further CB pulses from advancing counter 475 and hence anytime there is a signal to the load terminal 501 of counter 497 a binary eight will be jammed therein. Accordingly, at the 68th HDR the video control is synchronized and the margin is 68 horizontal lines.

The output signals to the video display itself are transmitted on the coaxial cable 482. It should be noted in FIG. 11 that there is a dual function device 481 mentioned above which is an integrated circuit and in the preferred embodiment is manufactured by the Texas Instrument Corporation and is designated as 74LS123. The upper portion of the integrated circuit 481 is a monostable, or a one shot, multivibrator while the lower portion is a free running multivibrator. When the first horizontal drive signal is transmitted on line 451, in addition to doing what has previously been described, it is also transmitted to the input of the monostable multivibrator portion of the integrated circuit 481. The horizontal drive signal causes the monostable multivibrator to be activated into its unstable state and accordingly the output on line 483 is low, while the output on line 485 is high. The output on line 483 can be traced to provide a clear signal to the binary counters 489 and 491 in FIG. 10. The high signal on line 485 can be traced along line 495 to provide an input to the horizontal line counter 497 in FIG. 10 as previously described. Accordingly each time that the horizontal drive signal is generated, which occurs each time the horizontal line is going to be displayed, or generated, in the video system, the binary counter 489 and 491 are cleared and the horizontal line counter 497 counts another horizontal line.

It should be understood at this time that the information displayed on the video has each character displayed within a five by eight group of dots, although the position for each character is within an eight by eight raster of dot positions but three of these dot positions (on the right-hand side of the five by eight raster) are used for effecting a space between the characters. Accordingly, the horizontal line counter 497 accepts eight counts before it provides an output indicating that there has been a sufficient number of horizontal scans to provide information for a line of characters. It will be recalled that a binary eight was jammed in the counter 497. When the horizontal counter 497 reaches the count of sixteen, the counter reads 0000. Hence, there is an output on line 482 which is high from NOR gate 484 and the high signal provides a low signal from NOR gate 480 to LOAD input 501 to jam a binary eight in counter 497. The foregoing is true because Qd of counter 475 is still high. Hence, the signals on the lines 503, 505 and 507 are zero. The reason that this operation takes place is so that the address lines 503, 505 and 507 into the character generator 509 can keep an account of the horizontal line for which the character generator is generating pulses and so that the initial position is 000 rather than 100.

Let us consider the character generator operation since we have introduced the necessity of horizontal line determination of the address. The character generator 509 in FIG. 10 accepts data from the RAMS 403 and 405 on the lines 511. When the data is transmitted to the character generator, the character generator operates to provide eight pulses in parallel indicative of the information for the top line of the characters. For instance, if a character to be displayed is the numeral 1 and the numeral 1 were to be located within a raster of five dots of the eight positions, then the signals transmitted in parallel from the character generator on the lines 513 would be 00100000. The 1 would indicate a requirement for a light beam at that point when the video display is effected. The signals from the character generator are transmitted on the lines 513 to the shift register 515 from whence they are transmitted serially on the line 517 and the gate 519. In the preferred embodiment the shift register 515 is manufactured by the Texas Instrument Corporation and is designated as 74LS165. Obviously, other forms of shift registers could be used. The serially transmitted signals to the gate 519 are transmitted through that gate and provide input signals to the coaxial cable 682 which delivers the signals to the CRT of the video display. The gate 519 is an AND gate and the other inputs thereto which appear on lines 521 and 523 are respectively from the blanking output of the CCSC and from the video select signal on line 525. The video select signal is transmitted along the line 527 through the invertor 529 and through the NOR gate 531. Since the video select signal is high, it is converted to a low signal by the inverter 529 and back into a high signal by the NOR gate 531 to provide a high signal input to AND gate 519. In a like manner when the system is not requiring a blanking condition, the blanking signal on line 521 will be high so that all of the inputs to the AND gate 519 are high at the time that information is to be displayed.

If we examine once again the character generator in conjunction with the operation of the horizontal line counter 497, we find that as the horizontal line counter counts the horizontal lines, the address signals on the lines 503, 505 and 507 change so that the character generator knows that it is providing information on the first line, second line, the third line, etc.

Returning to the integrated multivibrator circuit 481, we find that after the horizontal drive signal has been generated and the monostable multivibrator has been placed in its unstable condition, (to effect the clearing of the binary counter and transmitting a count to the horizontal line counter 497), the circuit operates to have the monostable multivibrator return to its stable state at which time the free running multivibrator in the other half of the device 481 provides clock signals on line 533. These clock signals are transmitted to the gate 535 as well as to the shift register 515. The clock signals to the shift register 515 of course cause that shift register to advance, and since the free running multivibrator is the clock signal source for the video operation, the signals from the shift register are advanced in accordance with that synchronization. The clock signals from the free running multivibrator on line 533 are transmitted through the AND gate 535 to the input of the counter 537. The counter 537 in the preferred embodiment is manufactured by the Texas Instrument Corporation and is designated as 7490. The purpose of the counter 537 is to count eight clock pulses indicating that information necessary for one character on one scanning line has been transmitted and the output from the counter 537 is delivered from line 539 to the inverter 541 to serve as an input to the binary counters 489 and 491. Hence, every time a portion of the character has been displayed, i.e., there have been eight dot positions provided for a character, the binary counters 489 and 491, which are coupled, are advanced. This causes the address signals on lines 543 and 545 to be incremented and eventually this provides a count 64. It should be noted that the binary counters 489 and 491 are coupled serially so that the carry signal from the binary counter 489 is transmitted as an input into the binary counter 491. It was just indicated that the lines 545 carry the address signals from the binary counter 491 but actually two of the address signals are carried from the counter 547. The input to the counter 547 occurs on line 549 and is a carry output from the horizontal line counter 497. As was discussed earlier, when the horizontal line counter 497 has counted to sixteen indicating that there has been sufficient information for one character, the output therefrom is transmitted to the counter 547. The video display is able, in the preferred embodiment, to show sixteen character lines with a possible 64 characters per line. The counter 547 is a character line counter.

The output signals on lines 553 are transmitted through the multiplexer 435 along the lines 555 to make up part of the address signals to the RAMS 403 and 405.

The data displayed on the video CRT as shown in FIG. 3 is of course stored in the RAMS 403 and 405 and is extracted therefrom in accordance with the description just given so that this information can be seen. The manipulation of the data before it is stored in the RAMS 403 and 405 is done by the microprocessor.

FIG. 13 shows an overall view of the system. In the end box 701 there is a motor means which has a belt secured therearound. The belt moves around an idler pulley in end box 703. The head 103 is secured to the belt so that when the motor is driven in a first direction the head 103 will move to the right and when the motor is driven in the other direction, the head 103 will move to the left. There are a pair of wires located in the channel 705. The pair of wires lie above but along the direction of the path of this head. Hence, when the head is going to scan the copy 707 for either markers or a color swatch bar, the markers or color swatch bar are aligned under the wires to make certain that the head 103 traverses the markers or the color swatches. The copy is held in alignment by the guide bar which is more fully described in my U.S. Pat. No. 4,205,915 entitled "Sheet Positioning Means". The alignment of the wires is made convenient by the mirror 711 and the alignment arrangement is more fully described in my U.S. Pat. No. 4,237,616 entitled "Scanning Path Alignment Means".

There are provided in close proximity to the end boxes 701 and 703 two "end of travel" switches which when tripped cause the motor to reverse its direction to keep the head from crashing into the end boxes. In FIG. 13, the video display device 713 and the console 715 are shown.

What I claim is:

1. A method for determining black marker locations for use to determine what colors of a color swatch bar should be read by a scanning head comprising the steps of:
   (a) advancing a scanning head over said markers to detect when the color black is read;
   (b) storing in a first memory means a number which represents an acceptable width of a black marker;
   (c) generating clock pulses which when accumulated represent a value that is commensurate with the distance said scanning head has been advanced;
   (d) counting said clock pulses and storing the accumulated value in a second memory means;
   (e) storing the count from said second memory means into a third memory means when said scanning head reads the color black;
   (f) subtracting the count in said third memory means from the count in said second memory when said head ceases to read the color black;
   (g) comparing the difference determined in step (f) with the value in said first memory means and if the difference is less;
   (h) storing the value in said third memory means into a fourth memory means indicating that there is a black marker at the location indicated by the value in said fourth memory means.

2. A scanning densitometer system for automatically monitoring a plurality of color inked areas on material and for automatically identifying which of a plurality of ink control positions related to said areas may be in need of a control change comprising in combination:
   moving means formed and disposed to move light sensitive detecting means along a path in close proximity to said plurality of color inked areas in order to scan said areas;
   light sensitive detecting means coupled to said moving means to be moved thereby and formed to direct light to each of said color inked areas being scanned and further formed to have three light receiving channels therein to receive light in said three channels simultaneously as reflected from each of said color inked areas being scanned;
   detection means disposed in said three channels to simultaneously generate three electrical signals which are respectively indicative of the optical densities of the basic colors cyan, magneta and yellow present at each of said color inked areas being scanned;
   first logic circuitry means coupled to said detection means to receive said three signals and formed to compare said three signals to automatically determine at each of said color inked areas being scanned, which basic color is predominant thereat and the optical density value thereof;

said first logic circuitry means coupled to said moving means to determine and remember the location of each of said color inked areas being scanned;

second logic circuitry means, including memory means, coupled to said first logic circuitry means to act with said first logic circuitry means to compare said predominant basic color optical density value at each of said color inked areas being scanned with a reference optical density value for a basic color being compared; and, display means coupled to said first and second logic circuitry means to display the location of each color inked area being scanned and display how its predominant basic color optical density value compares with its associated reference value whereby the need for adjusting an ink control position associated with a color inked area would become apparent.

3. A densitometer system according to claim 2 wherein said three light receiving channels are first, second and third apertures and wherein in said first, second and third apertures there are respectively disposed red, green and blue light filters.

4. A densitometer system according to claim 2 wherein there is further included a shaft pulse generator coupled to said moving means which generates shaft pulses which when counted are commensurate with the locations of said light sensitive detecting means along said path.

5. A densitometer system according to claim 4 wherein said first logic circuitry means includes logic circuits to detect when said light sensitive detecting means has read markers on a first excursion and includes logic circuits to count said shaft pulses and store the values thereof at the time said light sensitive detecting means has read markers.

6. A densitometer system according to claim 5 wherein said first logic circuitry includes means to continually count said shaft pulses as said light sensitive detecting means moves on a second excursion and compare said count with said values stored when said light sensitive detecting means read markers on said first excursion so that, when said count and said values stored match, the system accepts the electrical signals from said detection means to determine the color of the area being scanned at that time.

7. A densitometer system according to claim 2 wherein there is further included a console having despressable keys and adjustable thumbwheels for entering information into said first and second logic circuitry means.

8. A densitometer system according to claim 7 wherein said display means includes video display means and video control circuitry connected thereto and wherein said video control circuitry is connected to said first and second logic circuitry means to receive data and instructions therefrom to display (1) the values of optical densities determined by said light sensitive detecting means operating with said detection means, (2) the color identifiers associated with said optical densities displayed and (3) the foregoing at locations on said display means which are commensurate with associated ink control positions.

9. A densitometer system according to claim 7 wherein said thumbwheels set the minimum and maximum tolerance values with which the optical densities should be compared and circuitry means to connect said console to said first and second logic circuitry means, to enter said tolerance values and video display means and video control circuitry connected thereto and wherein said video control circuitry is connected to said first and second logic circuitry means to receive data and instructions therefrom to display (1) a first symbol if the difference between the optical density and a reference density does not exceed the minimum tolerance, (2) a second symbol if the difference between the optical density and a reference density exceeds the minimum tolerance but does exceed the maximum tolerance and (3) a third symbol if the difference between the optical density and a reference density exceeds the maximum tolerance.

10. A densitometer system according to claim 2 wherein said display means includes video display means and video control circuitry connected thereto and wherein said video control circuitry is connected to said first and second logic circuitry means to receive data and instructions therefrom to display (1) the values of optical densities determined by said light sensitive detecting means operating with said detection means and (2) the color identifiers associated with said optical densities displayed.

* * * * *